Jan. 6, 1942.  L. W. YOUNG  2,268,995
SOLDERING IRON
Filed July 1, 1939
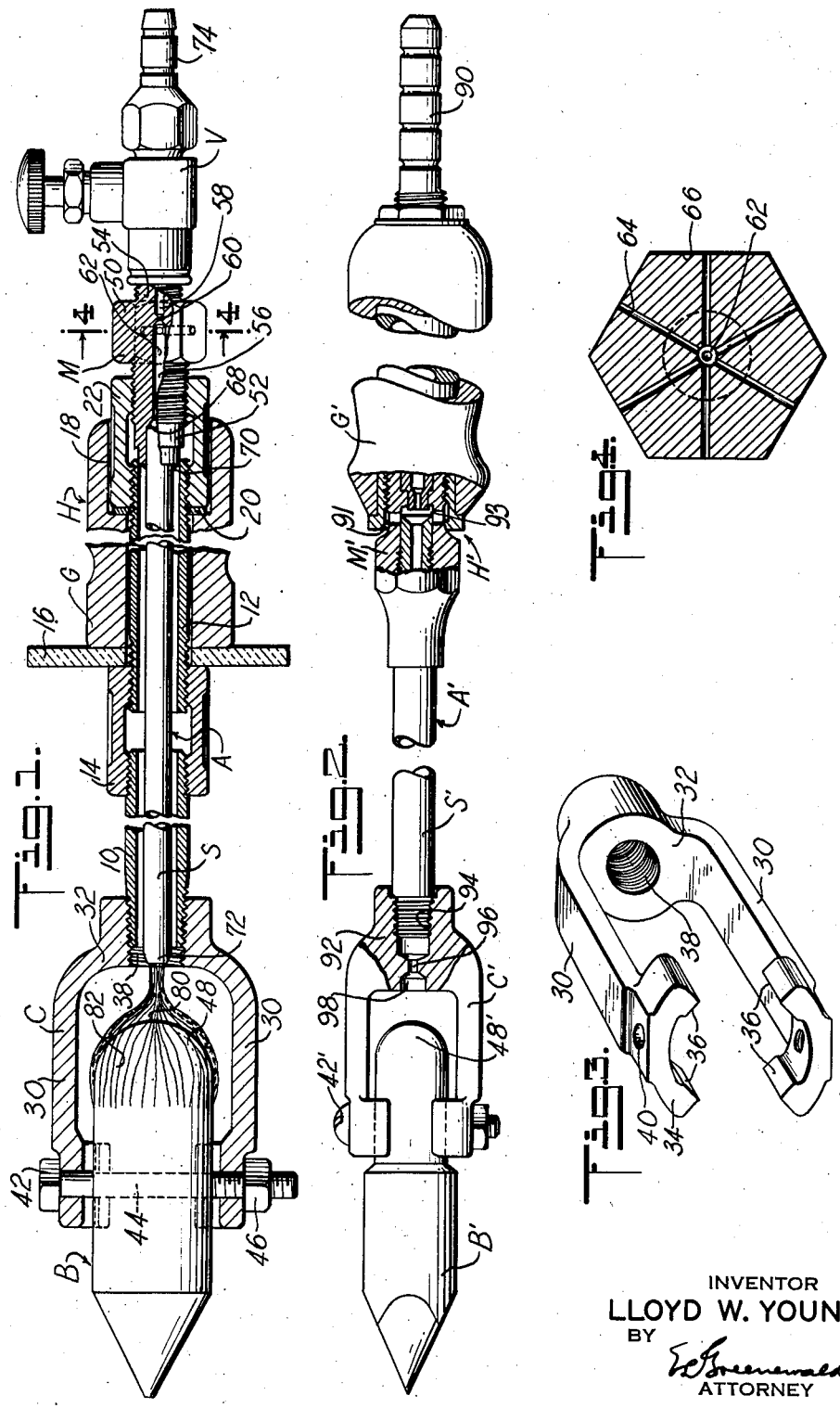
INVENTOR
LLOYD W. YOUNG
BY
ATTORNEY Patented Jan. 6, 1942

2,268,995

UNITED STATES PATENT OFFICE 2,268,995

SOLDERING IRON

Lloyd W. Young, Scotch Plains, N. J., assignor to Oxweld Acetylene Company, a corporation of West Virginia Application July 1, 1939, Serial No. 282,525

15 Claims. (Cl. 158—26)

This invention relates to soldering irons, and more particularly to self-heating soldering irons in which a gaseous fuel is used as the heating medium.

Among the objects of the invention are to provide an improved soldering iron in which soldering bits of various dimensions may be used and mounted in a manner permitting ready interchangeability; in which substantially complete combustion of the gaseous heating fuel is assured; in which a part of the soldering bit has a novel shape and is directly heated by the gas flame in a more efficient manner; in which the relation between the heating flame and the soldering bit may be varied without impairing the heating efficiency; in which the air-fuel mixer is so located that a minimum amount of exhaust or burned gases will be drawn into the mixer; in which the mixed gases will be prevented from overheating and will remain relatively cool in passing through the soldering iron from the mixer to the point of combustion; in which the mixed gases are conducted from the mixer to the point of combustion independently of the supporting or handle structure of the soldering iron whereby the joints in the supporting or handle structure need be made only mechanically-tight and not gas-tight; and which improved soldering iron is simple in construction, economical to manufacture, and efficient in operation.

These and other objects of the invention will in part be obvious and in part become apparent from the following description and the accompanying drawing, in which:

Fig. 1 is a central longitudinal sectional view of one form of soldering iron embodying the principles of this invention, and showing the relation of the heating flame to the soldering bit;

Fig. 2 is a side view, partly in section, of another form of soldering iron embodying the principles of this invention;

Fig. 3 is a perspective view of the clamp which holds the bit of the soldering iron illustrated in Fig. 1; and Fig. 4 is a sectional view taken on the line 4—4 of Fig. 1 and looking in the direction of the arrows.

Generally speaking, the soldering iron illustrated in Fig. 1 includes an elongated handle assembly H carrying a U-shaped bit holder or clamp C in which soldering bits B of various diameters may be secured interchangeably. A burner stem and mixer assembly A is secured to, and extends forwardly completely through, a passage in the handle assembly H in coaxial spaced relation with the handle assembly. A fuel gas control valve V may be mounted at the rear of the stem and mixer assembly to control the flow of fuel gas therethrough.

The handle assembly H comprises axially aligned tubular members, such as elongated nipples 10 and 12, each externally threaded at both ends. The rear end of member 10 is united to the forward end of member 12 by a threaded coupling 14, and a large diameter centrally apertured disc, baffle, or shield 16 of heat-insulating material fits loosely over the member 12 and is clamped between the coupling 14 and the front end of an elongated grip or handle G. The rear end of the handle has a recess 18, in which is seated a member such as a washer 20; and a reducer or other suitable threaded coupling 22 threadedly engages the rear end of member 12 and abuts washer 20 to retain disc 16 and grip G in assembled relation on the handle assembly H.

The clamping means or bit holder C includes a pair of relatively narrow, forwardly extending T-shaped arms 30 integrally connected by a bight portion 32, with the head of each T forming a transversely extending arcuate clamping jaw 34 provided on its inner side with a pair of spaced gripping faces 36. The portions of the jaws 34 between their gripping faces 36 desirably are spaced from the soldering bit B, thereby lessening heat conduction from the bit to the jaws and also permitting the flame and hot gas to pass along and heat those surfaces of the bit which are between the gripping faces 36. A hole is formed in the bight 32, as at 38, and the forward end of member 10 is threaded into this hole to maintain the clamp C assembled to the handle assembly H. As shown, suitable reinforcement may be provided around the hole 38. A hole 40 is drilled centrally through each jaw 34 and the holes 40 are aligned to receive a headed bolt 42 which extends through a hole 44 drilled transversely through the soldering bit B between the front and rear end thereof. A nut 46 fits the threaded end of bolt 42 and is adjustable thereon to draw the gripping faces 36 of jaws 34 into clamping engagement with the bit B. The arms 30 are sufficiently flexible so that various sizes of soldering bits may be secured interchangeably into the clamp C. The front end of the bit may be substantially conical; the intermediate lateral portion may be cylindrical; and, for a purpose to be described hereinafter, the soldering bit B is formed with a rounded, convex, or substantially hemispherical rear end 48 which merges smoothly with the intermediate cylindrical surface and is space from the bight 32 of clamp C. The gripping faces 36 of clamp C engage the bit only adjacent the forward end of the intermediate cylindrical surface, which surface extends forwardly beyond the clamp C.

For reasons which will be more apparent hereinafter, the various connections between the several elements of the handle assembly H, and the joint between the handle assembly and the bit holder or clamp C, need be made only mechanically-tight, as these elements perform the function of a supporting structure only and therefore need not be assembled in gas-tight relation.

The burner and mixer assembly A is mechanically independent of the handle assembly H and the bit holder or clamp C, and includes a mixer M and tubular means, such as a burner stem or gas mixture conduit S. The mixer M is formed with an intermediate section 50, having a polygonal periphery, and with integral, threaded trunnions or nipples 52 and 54 extending centrally in either direction from the intermediate section. A gas passage 56 is drilled through the mixer centrally of the nipples 52 and 54 and of the section 50, and includes an inlet 58 of relatively small diameter, a restricted throat 60, and an outlet 62 of relatively large diameter. Passages 64, drilled radially through each polygonal face 66 of the section 50, intersect outlet 62 just forwardly of the throat 60. The outlet 62 is enlarged at its forward end to form a recess 68 in which may be gas-tightly secured, by suitable means such as solder 70, the rear end of the burner stem or conduit means S. The opposite, or forward end, 72 of the burner stem may be swaged, or otherwise deformed, to reduce its internal and external diameter.

The burner and mixer assembly A may be detachably mechanically connected to the handle assembly H by threaded engagement between the forward nipple 52 of mixer M and the coupling 22. When so assembled, the stem S extends forwardly through, and in coaxial spaced relation to, the members 10 and 12 of the handle assembly H, and terminates adjacent the forward face of the bight 32 of the bit holder or clamp C. The bit B and stem S preferably are disposed in axial alignment, and the forward end 72 of the burner stem S is spaced from the rear end 48 of the soldering bit B, which, as has been previously described, is secured in the bit holder or clamp C by the bolt 42 and the nut 46. A suitable throttle valve V may be threadedly secured to the rear nipple or trunnion 54 of the mixer M, and a suitable hose connection 74 may be secured in a well known manner to the outer or rear end of the valve V for supplying a combustible gas thereto.

When it is desired to use the form of soldering iron illustrated in Fig. 1, the valve V is opened to permit a gaseous fuel, such as acetylene, to flow through the mixer M where it passes through the inlet 58 to the throat 60. As the gaseous fuel, which is under some pressure, passes from the throat 60 to the outlet 62 it aspirates air through the radial passages 64, and the resulting combustible mixture flows through the stem S to the forward end 72 thereof where it may be ignited. This air-fuel gas flame impinges against the central portion of the rounded or hemispherical rear or inner end 48 of the soldering bit B to heat the bit. Due to the rounded or substantially hemispherical contour of the rear end of the bit B, the flame flows radially in all directions along and clings closely to the rear surface of the bit, as shown in Fig. 1, and uniformly follows the cylindrical surface of the bit forwardly toward the tip. The outer envelope 82 of the flame consumes additional atmospheric oxygen aspirated through the relatively large open areas of clamp or bit holder C. It will be noted that the interior of the bit holder or clamp is substantially completely open to atmosphere, thus assuring ingress of sufficient atmospheric oxygen to assure substantially complete combustion of the fuel gas. This substantially complete combustion assures efficient utilization of the combustible mixture thus preventing aspiration of the unburned gas into the passage 64 of the mixer M and also prevents odors due to unburned gas.

Due to the convex or hemispherical shape of the rear end of the bit B, the relation between this flame and the bit may be varied without impairing the heating efficiency of the flame, as the flame will always cling to the rounded rear end surface of the bit and uniformly cling to and follow the cylindrical portion of the bit surface forwardly toward the tip. It will be apparent that this would not be the case if the rear end of the bit B were stepped, or formed in other shapes than convex or hemispherical, as any interruptions in the bit surface would tend to deflect the flame away from the bit.

The enclosure of the stem S in the handle assembly H in coaxial spaced relation therewith leaves an air space between the handle assembly and the burner stem and, due to the relatively long stem, overheating of the air-fuel gas mixture and consequent burning within the stem is substantially prevented. As the mixer M is located at the rear end of the soldering iron, there is little if any opportunity for exhaust or burned gases to be aspirated into the passages 64 of the mixer. The disc 16, which is formed of heat-resisting material, projects a substantial distance radially beyond the periphery of the handle assembly and thus protects the operator from the heat of the flame and also assists in preventing aspiration of burned or exhaust gases into the mixer.

The soldering iron shown in Fig. 2 of the drawing illustrates another form in which the principles of the invention may be embodied. While differing somewhat in details, the soldering iron shown in Fig. 2 is generally similar to that shown in Figs. 1, 3, and 4, and like reference characters primed have been used to indicate like or corresponding parts.

In this form of the invention a handle assembly H' may be secured to a mixer assembly A', and the forward end of the stem S' of the burner and mixer assembly may be threadedly secured to a bit holder or clamp C'. A soldering bit B' may be detachably mounted in the bit holder or clamp C' in the same manner as the bit B is secured in the clamp or bit holder C. Acetylene, or other suitable fuel gas, is preferably supplied to the handle assembly H' by means of a suitable hose connection 90 secured to the rear end of the handle assembly, and passes forwardly through the handle assembly to the mixer M' at which point air is aspirated into the mixer assembly through the openings 91 and 93. The resulting combustible mixture then passes forwardly through the stem S'.

The clamp C' differs somewhat from the clamp C. The bight 92 is formed with a passage including a threaded recess 94 to which the forward end of the stem S' is secured, in spaced relation to the bottom of the recess. The air-fuel gas mixture, after issuing from the stem S', passes through the recess 94 into a restricted orifice or throat 96, from which it issues into an enlarged recess 98, and the resulting flame is directed against the convex or hemispherical rear end 48' of the bit B'.

In this embodiment of the invention, as well as that illustrated in Figs. 1, 3, and 4, the relation between the rear end of the soldering bit B' and the forward end of the stem S' is not critical and the flame impinges upon the rounded, substantially hemispherical rear end of the bit, clings closely thereto and follows the cylindrical portion of the bit surface forwardly toward the tip, as illustrated in Fig. 1 of the drawing. The large open area of the clamp or bit holder C' permits ingress of sufficient atmospheric oxygen to assure substantially complete combustion of the combustible mixture.

While particular embodiments of the invention have been shown and described, it will be obvious to those skilled in the art that modifications may be made in the details shown and that certain features may be used independently of others, without departing from the spirit and scope of the invention.

What is claimed is:

1. A soldering iron comprising, in combination, an elongated handle assembly; a soldering bit detachably secured to the forward end of said handle assembly; conduit means extending completely through said handle assembly in mechanically independent, coaxial spaced relation thereto for directing a heating flame against said soldering bit; means for supplying a combustible gas to said conduit means; means disposed rearwardly of said handle assembly for aspirating a combustion-supporting gas into said conduit means to form a combustible mixture therein; and means disposed adjacent the forward end of said handle means and formed to provide aspiration of additional combustion-supporting gas into said heating flame.

2. A soldering iron as claimed in claim 1, including a baffle mounted on an intermediate portion of said handle assembly and extending a substantial distance radially beyond the periphery of said assembly, said baffle retarding aspiration of burned exhaust gases into said conduit means.

3. A soldering iron comprising, in combination, a soldering bit; a handle having a passage therethrough; means connecting said bit to said handle, said means including tubular means extending through said passage to the rear end thereof; an air and fuel gas mixer secured to the rear end of said tubular means; and a gas mixture conduit extending completely through said tubular means in mechanically independent, coaxial spaced relation thereto, the rear end of said conduit communicating with said mixer and the forward end of said conduit being adapted to discharge a gas mixture adjacent said bit to provide a flame for heating said bit.

4. A soldering iron comprising, in combination, a handle having a passage therethrough; tubular means secured in said passage; a soldering bit opposite one end of said handle; an air and fuel gas mixer secured to the other end of said tubular means adjacent the other end of said handle; and a gas conduit communicating with said mixer and extending completely through said tubular means in mechanically independent, coaxial spaced relation thereto, said mixer being adapted to discharge an air and fuel gas mixture into said conduit and the mixture discharging from the outlet end of said conduit being adapted to provide a flame to heat said bit.

5. A soldering iron comprising, in combination, an elongated handle assembly; a soldering bit detachably secured to the forward end of said handle assembly; a mixer detachably secured to the rear end of said handle assembly; and means, secured in gas-tight relation to said mixer and extending forwardly therefrom substantially completely through said handle assembly in mechanically independent, coaxial spaced relation therewith, for directing a heating flame against the rear surface of said soldering bit.

6. A soldering iron comprising, in combination, an elongated handle assembly; clamping means secured to the forward end of said handle assembly; a soldering bit detachably secured to said clamping means; a mixing assembly detachably secured to the rear end of said handle assembly and extending forwardly completely through said handle assembly in mechanically independent, coaxial spaced relation therewith to direct a combustible gas mixture against said soldering bit; and means for delivering a combustible gas and a combustion-supporting gas to the rear portion of said mixing assembly, said clamping means being formed to permit substantially unrestricted access of atmospheric oxygen to the vicinity of said soldering bit to insure substantially complete combustion of the combustible gas mixture directed against said bit by said mixing assembly.

7. A soldering iron comprising, in combination, an elongated handle assembly; a soldering bit detachably secured to the forward end of said handle assembly; an elongated mixing assembly extending forwardly completely through said handle assembly in mechanically independent, coaxial spaced relation therewith; and means providing a single detachable mechanically-tight joint between the rear ends of said assemblies.

8. A soldering iron comprising, in combination, an elongated handle assembly; a relatively narrow U-shaped clamp secured to the forward end of said handle assembly; a soldering bit detachably secured in said clamp; and a burner and mixer assembly mechanically secured to the rear end of said handle assembly and extending forwardly through said handle assembly in independent, coaxial spaced relation therewith, the forward end of said mixer assembly terminating substantially adjacent the forward end of said handle assembly.

9. A soldering iron as claimed in claim 8, in which said burner and mixer assembly includes a mixer and a stem secured together in gas-tight relation and said mixer is disposed rearwardly of the rear end of said handle assembly.

10. A soldering iron as claimed in claim 8, in which a shield of heat-resisting material is mounted on said handle assembly intermediate the ends thereof and extends a substantial distance radially beyond the periphery of said handle assembly.

11. A soldering iron as claimed in claim 8, in which said handle assembly comprises a pair of elongated tubular members; a coupling connecting said members; a disc of heat-resisting material surrounding the rearward tubular member and abutting said coupling; a tubular handle surrounding the rearward tubular member and abutting said disc, the rear end of said handle being formed with a recess; and a member engaging the rearward tubular member and seated in said recess for holding said handle and disc in assembled relation to said tubular members and coupling.

12. For use with a soldering iron including a handle assembly and a bit, a relatively narrow U-shaped clamp having a bight portion adapted to be detachably secured to the forward end of such handle assembly, each arm of said U-shaped clamp being formed at its outer end with a transversely extending clamping jaw and each of said clamping jaws being provided with a pair of spaced gripping faces adapted to clampingly engage such bit.

13. A soldering iron comprising, in combination, a pair of elongated nipples; a coupling uniting said nipples; a soldering bit detachably secured to the end of one of said nipples; a mixer; means for supplying a combustible gas and a combustion-supporting gas to said mixer; a stem secured in gas-tight relation to said mixer; and means detachably securing said mixer to the end of the other of said nipples in such a manner that said stem extends forwardly completely through said nipples and coupling for directing a heating flame against the rear end of said soldering bit; said stem being mechanically independent of, coaxial with, and completely spaced from said nipples and coupling throughout its entire length, whereby an air space is provided within said nipples and coupling and surrounding said stem to prevent overheating and burning in said stem of the combustible gas mixture supplied by said mixer to said stem for such flame.

14. A clamp as claimed in claim 12, in which said bight portion is formed with a passage extending therethrough, such passage having a restricted orifice therein.

15. A soldering iron comprising, in combination, an elongated handle assembly; a soldering bit detachably secured to the forward end of said handle assembly; elongated conduit means, extending forwardly completely through said handle assembly, for directing a heating flame against the rear surface of said bit; means for detachably securing the rear end of said conduit means to the rear end of said handle assembly; and means for supplying a combustible gas mixture to the rear end of said conduit means; said conduit means being coaxial with and completely spaced from said handle assembly throughout its entire length, whereby an air space is provided within said handle assembly and surrounding said conduit means to prevent overheating and burning within said conduit means of said combustible gas mixture for such heating flame.

LLOYD W. YOUNG.